United States Patent
Di et al.

(10) Patent No.: US 12,032,881 B2
(45) Date of Patent: Jul. 9, 2024

(54) PHOTOVOLTAIC AND OPTOELECTRONIC DEVICES BASED ON PHOTON CONFINEMENT EFFECT

(71) Applicant: Zhejiang University, Hangzhou (CN)

(72) Inventors: Dawei Di, Hangzhou (CN); Yaxiao Lian, Hangzhou (CN); Qian Zhou, Hangzhou (CN); Baodan Zhao, Hangzhou (CN)

(73) Assignee: Zhejiang University, Hangzhou (CN)

( * ) Notice: Subject to any disclaimer, the term of this patent is extended or adjusted under 35 U.S.C. 154(b) by 614 days.

(21) Appl. No.: 17/322,932

(22) Filed: May 18, 2021

(65) Prior Publication Data
US 2021/0365607 A1 Nov. 25, 2021

(30) Foreign Application Priority Data
May 19, 2020 (CN) .......................... 202010426684.7

(51) Int. Cl.
*G06F 30/20* (2020.01)
*G06F 111/10* (2020.01)
*H01L 31/04* (2014.01)

(52) U.S. Cl.
CPC .......... *G06F 30/20* (2020.01); *G06F 2111/10* (2020.01); *H01L 31/04* (2013.01)

(58) Field of Classification Search
CPC ....... G06F 30/20; G06F 2111/10; H01L 31/04
USPC .............................................. 703/2
See application file for complete search history.

(56) References Cited

U.S. PATENT DOCUMENTS 9,482,055 B2 * 11/2016 Huang .................... E21B 10/16

* cited by examiner

Primary Examiner — Brian S Cook
(74) Attorney, Agent, or Firm — Bayramoglu Law Offices LLC (57) ABSTRACT

A photon confinement theoretical model is proposed, and a solar cell structure model is designed based on the theoretical model, thereby providing a photonically-confined solar cell and optoelectronic device to effectively reduce the probability of photons escaping from the cell. The theoretical model is established by the following steps: obtaining a relationship between a photocurrent density and an incident photon energy; obtaining a relationship between a radiative recombination photocurrent density and the incident photon energy; determining a relationship between the radiative recombination photocurrent density and a total recombination photocurrent density; obtaining a relationship between the photocurrent density generated by the standard spectral irradiance, the total recombination photocurrent density and an external current density of the solar cell; obtaining an output open-circuit voltage of the cell; obtaining an output short-circuit current density of the cell; obtaining a fill factor (FF); and obtaining a maximum power conversion efficiency (PCE).

4 Claims, 3 Drawing Sheets

PHOTOVOLTAIC AND OPTOELECTRONIC DEVICES BASED ON PHOTON CONFINEMENT EFFECT

CROSS REFERENCE TO THE RELATED APPLICATIONS

This application is based upon and claims priority to Chinese Patent Application No. 202010426684.7, filed on May 19, 2020, the entire contents of which are incorporated herein by reference.

TECHNICAL FIELD

The present invention belongs to the technical fields of renewable energy, materials and electronics.

BACKGROUND

Photovoltaic solar cells have become an important technology for the sustainable development of human society. Silicon-based solar cells remain to be the driving force for the commercialization of photovoltaic technologies. Photovoltaic cells based on III-V semiconductors, for example, exhibit superior power conversion efficiency. Emerging photovoltaic technologies are starting to show their strong competitive edges. For example, perovskite cells, III-V (GaAs-based) cells, II-VI (such as CdTe and CdS) cells, copper indium gallium selenide (CIGS) cells, copper zinc tin sulfide (CZTS) cells are moving toward comparable or higher efficiencies. The Shockley-Queisser (SQ) model, published in 1961, has been a theoretical landmark in the field of photovoltaic power generation. At present, many researchers are aiming at approaching the efficiency limits predicted by the SQ model by using different approaches. However, the ultimate efficiencies of single-junction solar cells made from any materials are fundamentally constrained by the SQ limit. While tandem solar cell structures are currently the only practical approach to surpassing the SQ limit among a number of next-generation photovoltaic concepts, single-junction solar cells, if similar high efficiencies can be achieved, would become more competitive as they involve simpler preparation processes and less stringent requirements for spectral matching.

It is assumed in the SQ model that non-radiative recombination losses must be completely suppressed to reach the ultimate efficiency limits, but radiative recombination losses are inevitable, serving as a major factor that results in the fact that the open-circuit voltage limit (also referred to as quasi-Fermi level splitting) is considerably lower than the semiconductor bandgap. It is, therefore, highly desirable to propose a new method or design to significantly improve the energy conversion efficiency of solar cells to approach or even surpass the SQ limit.

SUMMARY

The present invention proposes a photonically-confined solar cell model, and designs device structures based on the theoretical model, thereby providing photonically-confined solar cell (PCSC) and optoelectronic devices to effectively reduce the probability of photons escaping and energy losses from the devices.

According to the present invention, the theoretical model is established by the following steps:

step L1: determining a photocurrent density of the solar cell generated by a standard AM1.5G solar spectral irradiance, and obtaining a relationship between the photocurrent density and an incident photon energy;

where, the photocurrent density generated by the standard AM1.5G solar spectral irradiance can be described by:

$$J_{sun} = \int_0^\infty a(E)\frac{q\lambda}{hc} I_{AM1.5G} dE; \qquad (1)$$

where, $J_{sun}$ is the photocurrent density generated by the standard AM1.5G solar spectral irradiance; q is the elementary charge; $\lambda$ is the wavelength of the photons; h is the Planck constant; E is the photon energy; $I_{AM1.5G}$ is the standard AM1.5G spectral irradiance; c is the speed of light; $\alpha(E)$ is the absorption coefficient of a photovoltaic material as a function of wavelengths of light;

step L2: determining a radiative recombination photocurrent density of the PCSC generated in a photon confinement structure, and obtaining a relationship between the radiative recombination photocurrent density and the incident photon energy;

where, the relationship between a radiative recombination photocurrent flux $\phi_{rad}$ generated by the photonically-confined solar cell and an external voltage is expressed as:

$$\phi_{rad} = f_{esc} \int_{E_g}^\infty \frac{2\pi E^2}{h^3 c^2} \frac{1}{\left[e^{\frac{E-qV}{kT}} - 1\right]} dE; \qquad (2)$$

where, $\phi_{rad}$ is the radiative recombination photocurrent flux; $f_{esc}$ is an escape probability of photons generated in the cell; E is the photon energy; $E_g$ is the bandgap of the photovoltaic absorber material; $\pi$ is the Archimedes' constant; h is the Planck constant; c is the speed of light; V is the voltage corresponding to the quasi-Fermi level splitting within the absorber material; q is the elementary charge; k is the Boltzmann constant; T is the temperature of the solar cell; e is the base of the natural logarithm; the radiative recombination photocurrent flux is multiplied by the elementary charge q to obtain the radiative recombination photocurrent density $J_{rad}$:

$$J_{rad} = qf_{esc} \int_{E_g}^\infty \frac{2\pi E^2}{h^3 c^2} \frac{1}{\left[e^{\frac{E-qV}{kT}} - 1\right]} dE; \qquad (3)$$

step L3: determining the relationship between the radiative recombination photocurrent density $J_{rad}$ and a total recombination photocurrent density $J_{recom}$;

where, the relationship between the radiative recombination photocurrent density $J_{rad}$ and the total recombination photocurrent density $J_{recom}$ including radiative recombination and non-radiative recombination is expressed as:

$$J_{rad} = \eta_{rad} J_{recom} \qquad (4);$$

the total recombination photocurrent density $J_{recom}$ including radiative recombination and non-radiative recombination is $$J_{recom} = \frac{1}{\eta_{rad}} J_r = \frac{f_{esc} q}{\eta_{rad}} \int_{E_g}^{\infty} \frac{2\pi E^2}{h^3 c^2} \frac{1}{\left[ e^{\frac{E-qV}{kT}} - 1 \right]} dE; \quad (5)$$

step L4: establishing a current balance equation of the solar cell under the steady-state condition, and obtaining a relationship between the photocurrent density $J_{sun}$ generated by the standard AM1.5G solar spectral irradiance, the total recombination photocurrent density $J_{recom}$ and an external current density $J_{ext}$ of the solar cell:

$$J_{sun} - J_{recom} - J_{ext} = 0 \quad (6);$$

step L5: calculating the open-circuit voltage $V_{OC}$ of the cell numerically to obtain an open-circuit voltage output of the cell, and obtaining the external current density $J_{ext}$ of the solar cell by steps L1 and L3 as:

$$J_{ext} = \int_0^{\infty} a(E) \frac{q\lambda}{hc} I_{AM1.5G} dE - \frac{f_{esc} q}{\eta_{rad}} \int_{E_g}^{\infty} \frac{2\pi E^2}{h^3 c^2} \frac{1}{\left[ e^{\frac{E-qV}{kT}} - 1 \right]} dE; \quad (7)$$

where, the open-circuit voltage $V_{OC}$ is obtained by setting $J_{ext} = 0$:

$$\int_0^{\infty} a(E) \frac{q\lambda}{hc} I_{AM1.5G} dE - \frac{f_{esc} q}{\eta_{rad}} \int_{E_g}^{\infty} \frac{2\pi E^2}{h^3 c^2} \frac{1}{\left[ e^{\frac{E-qV}{kT}} - 1 \right]} dE = 0; \quad (8)$$

step L6: calculating a short-circuit current density $J_{SC}$ of the cell numerically to obtain a short-circuit current output of the cell, where the short-circuit current density $J_{SC}$ is obtained by setting V=0:

$$J_{SC} = \int_0^{\infty} a(E) \frac{q\lambda}{hc} I_{AM1.5G} dE - \frac{f_{esc} q}{\eta_{rad}} \int_{E_g}^{\infty} \frac{2\pi E^2}{h^3 c^2} \frac{1}{\left[ e^{\frac{E-qV}{kT}} - 1 \right]} dE; \quad (9)$$

where, after photons from the sunlight are converted by a semiconductor, E>>kT to derive $$e^{\frac{E}{kT}} \gg 1,$$

indicating that the second term $$\frac{q f_{esc}}{\eta_{rad}} \int_{E_g}^{\infty} \frac{2\pi E^2}{h^3 c^2} \frac{1}{\left[ e^{\frac{E-qV}{kT}} - 1 \right]}$$

is very small, so $J_{SC}$ is a constant independent of $f_{esc}$ and $\eta_{rad}$, and can be expressed as:

$$J_{SC} \approx \int_0^{\infty} a(E) \frac{q\lambda}{hc} I_{AM1.5G} dE; \quad (10)$$

step L7: obtaining a maximum power conversion efficiency (PCE) based on the current-voltage (IV) data, where the PCE of the solar cell is numerically calculated according to equation (9) and equation (10) in step L6 as:

$$PCE = \frac{P_{max}}{P_{sun}} = \frac{V_{mp} J_{mp}}{P_{sun}}; \quad (11)$$

where, $P_{max}$ is the maximum power output by the solar cell; $P_{sun}$ is the power of sunlight incident on the solar cell; $V_{mp}$ is the voltage of the solar cell at its maximum power point; $J_{mp}$ is the current density of the solar cell at its maximum power point;

step L8: obtaining the fill factor (FF) of the solar cell based on the TV data;

$$FF = \frac{V_{mp} J_{mp}}{V_{OC} J_{SC}}; \quad (12)$$

where, $V_{mp}$ is the voltage at the maximum power point of the solar cell; $J_{mp}$ is the current density at the maximum power point of the solar cell; $V_{OC}$ is the open-circuit voltage of the solar cell; $J_{SC}$ is the short-circuit current density of the solar cell.

In the present invention, a photon confinement model is proposed, and then a solar cell device structure is designed based on the model. A solar cell whose device operation fully or partly follows the photon confinement model is defined as a photonically-confined solar cell (PCSC). Photon confinement structures are provided on the surfaces and edges of the solar cell to effectively reduce the probability of photons escaping from the cell to increase the effective photon density inside the cell. These measures greatly increase the open-circuit voltage $V_{OC}$ and the FF of the cell, dramatically improving the power-conversion efficiency of the solar cell. Under the assumption of the photon confinement effect, there is a possibility that the theoretical limit of a single-junction solar cell surpasses the limit predicted by the SQ model. The present invention can increase the open-circuit voltage and the FF of the cell, thereby improving the efficiency, which broadens the research horizons for simple, low-cost, and high-efficiency single-junction solar cells.

DETAILED DESCRIPTION OF THE EMBODIMENTS

The present invention considers the possibility of constraining the radiative recombination pathway by means of photon confinement effects, and reduces the escape probability of the photons in the cell to suppress the radiative and non-radiative recombination losses simultaneously, thereby pushing the quasi-Fermi-level splitting to a maximum value that approaches the semiconductor bandgap.

The improvement of the performance of the device in the present invention depends on the suppression of both radiative and non-radiative recombination losses. The former (radiative recombination loss) is considered inevitable in the classical Shockley-Queisser (SQ) model. In a photonically-confined solar cell (PCSC) model, $V_{OC}$ is expected to approach the semiconductor bandgap, presenting a route to overcoming the challenge of voltage deficit in solar cells. The voltage deficit has two forms. One form corresponds to the voltage deficit caused by non-radiative recombination in the classical SQ model. In other words, for the widely used solar cell structures, when the energy loss caused by non-radiative recombination is eliminated, the open-circuit voltage $V_{OC}$ of the solar cell can approach the open-circuit voltage limit in the classical SQ model. The other form corresponds to the voltage deficit caused by non-radiative and radiative recombination in the PCSC model. In the PCSC model, when the probability of photons escaping from the cell is reduced, the voltage deficit caused by the non-radiative and radiative recombination can be eliminated. In this way, the open-circuit voltage $V_{OC}$ of the solar cell may surpass the open-circuit voltage limit in the classical SQ model to reach a higher theoretical limit. It is recently reported that the open-circuit voltage $V_{OC}$ and power conversion efficiency (PCE) of some single-junction cells are very close to the SQ limit. With the improvement of the performance of single-junction cells in the future, there is a possibility of surpassing the limit predicted by the SQ model. This possibility can be partially explained by the theoretical model of the present invention. Specifically, the improvement of the performance of materials and the optimization of the preparation process make it possible to prepare solar cells with large dielectric constant and excellent surface texture, thereby indirectly creating the possibility that the luminescent photons are trapped inside the cell to increase the photon density in the cell, that is, a small escape probability of photons is achieved, such that the photons are reabsorbed and the performance metrics of the cell are improved. The device structure and theoretical model of the present invention can be applied to many high-performance solar cell materials, and are suitable for photovoltaic cells with various bandgaps (0.1-4.3 eV) and wide-bandgap semiconductor materials. The optoelectronic device based on this concept has a high fill factor (FF), open-circuit voltage $V_{OC}$ and PCE under ideal conditions, which not only provides a framework for surpassing the SQ limit of single-junction cells, but also broadens the horizons for the fields of solar cells and optoelectronics, thereby laying a foundation for the realization of substantially improved solar cell performance. With the unremitting efforts of researchers, solar cells that surpass the conventional limits can be realized in the future. The theoretical model in the present invention can be extended to two-junction and multi-junction cells to further improve the efficiency of the two-junction and multi-junction cells. The optoelectronic devices based on this concept have high FF under ideal conditions, can provide a high on-off ratio near the maximum power point, and thus has potential advantages when applied in high-speed and precision logic devices.

The photon confinement theoretical model can be used to prepare optoelectronic logic devices and photodetector devices with high on-off ratios, and thus can be applied to photodetectors, diodes, transistors and integrated logic circuits thereof. Moreover, the photon confinement model can also be used to prepare high-performance light-emitting devices, and thus can be applied to light-emitting diodes (LEDs), light-emitting transistors (LETs), lasers, and photoluminescent devices to improve the light-emission efficiency and brightness, while regulating the emission wavelength, linewidth, and photon radiation rate and direction. Additionally, the photon confinement model can be used to prepare photothermal devices, and thus can be applied to photothermal power generation devices to regulate the efficiency, power, temperature, voltage and other parameters. The photon confinement model also provides research ideas for improving device performance metrics in other fields.

In the prior art, tandem cells have high efficiency, but involve complicated preparation processes. Moreover, different absorber layers in the tandem cells need to be spectrally matched, which imposes great limitations on the materials selection of the absorber layers. Therefore, tandem cells have not yet been widely used due to the fact that they involve complicated preparation processes and impose stringent requirements for spectral matching. On the other hand, the radiative and non-radiative recombination losses of the single-junction cell consume a substantial amount of energy in the cell, restricting the open-circuit voltage $V_{OC}$ and the short-circuit current density $J_{SC}$ in the cell from reaching their fundamental limits, thereby restricting the actual efficiency from reaching the ultimate limit. The technical problem to be solved by the present invention is to propose a photon confinement model, and design solar cell structures based on this concept. The structure of the present invention adopts a single-junction cell based on the photovoltaic materials that are commonly used currently, thereby reducing the preparation complexity and material selection requirements of the tandem cell. The photon confinement structures on the surfaces and edges of the cell can minimize the possibility of the internal photons escaping from the cell, thereby effectively limiting the energy loss caused by radiative and non-radiative recombination. By considering the new model, the open-circuit voltage $V_{OC}$ and the FF of the cell are significantly increased, thereby significantly increasing the PCE, which may approach or even surpass the limit of the SQ model. The objective of the present invention is to establish a model of the photonically-confined single-junction solar cell, and design a photonically-confined single-junction solar cell structure capable of increasing the open-circuit voltage $V_{OC}$ and the FF of the cell to improve the PCE, thereby broadening the research horizons for simple-operation, low-cost, high-efficiency single-junction solar cells.

Figure 1:
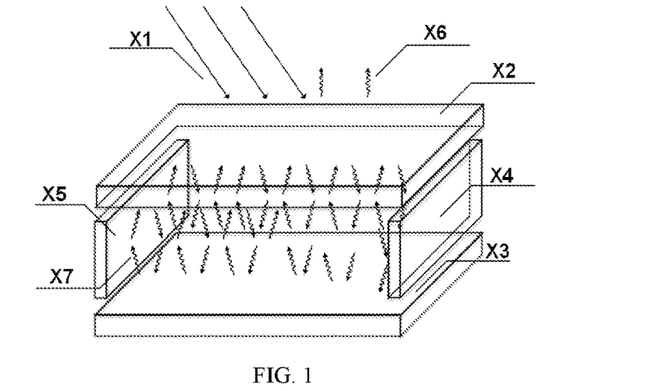
FIG. 1 is a structural diagram of a solar cell according to the present invention.

The present invention provides the following technical solution to solving the existing technical problem. The structure in the embodiment is only one of the methods for realizing a photonically-confined single-junction solar cell, but the model of the present invention is not limited to this structure. A design or structure capable of reducing $f_{esc}$ to less than 1, especially reducing $f_{esc}$ to less than ½ includes incident sunlight X1, a bandpass reflector X2, perfect reflectors X3, X4 and X5, escape photons X6 and confined photons X7. The bandpass reflector X2 at the top surface of the cell allows all photons with energy higher than the absorption wavelength of the semiconductor photovoltaic material to pass through and enter the absorber, so as to ensure that the cell fully absorbs the incident sunlight. The inner surface X3 at the bottom of the cell and the inner surfaces X4 and X5 on the side walls of the cell are all prefect reflectors (mirrors). After the sunlight enters a semiconductor photovoltaic absorber layer through the bandpass reflector, the semiconductor photovoltaic absorber layer converts the absorbed sunlight into photons X7. The photons X7 are generated in the cell, emitting internally in all directions. After reaching the prefect reflector (mirror) surface X3 at the bottom, the perfect reflector (mirror) surface X4 on the side wall and the perfect reflector (mirror) surface X5 on the side wall, all photons X7 return to the absorber layer without energy loss. The photons X7 reaching the top have lower energy than the photons absorbed by the semiconductor material, and thus are reflected back by the bandpass reflector X2 to the absorber layer without energy loss. However, since the bandpass reflector X2 is designed in such a way that only a very small fraction of photons are allowed to escape from the semiconductor photovoltaic absorber layer, there are still some photons X6 escaping from the surface of the cell.

Figure 2:
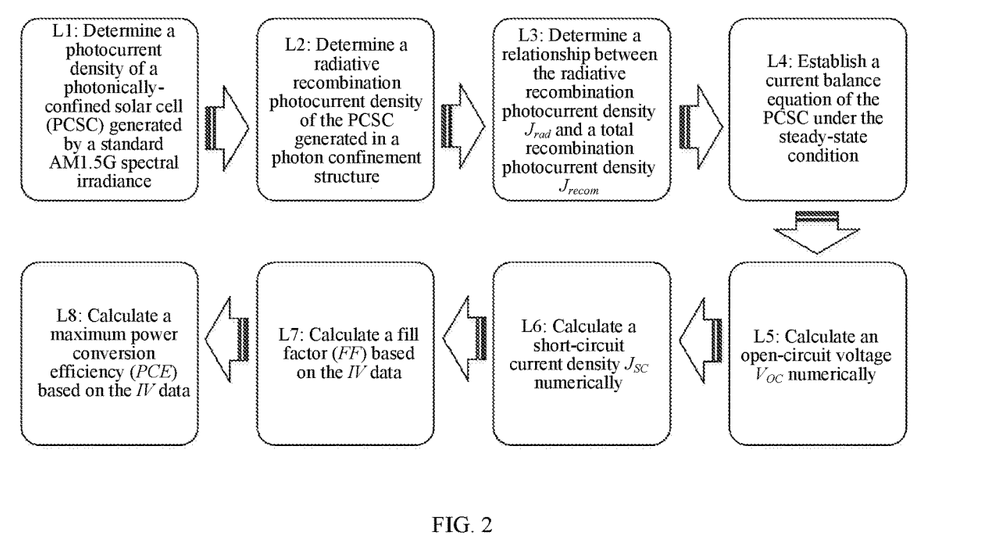
FIG. 2 is a flowchart of a method for deriving the theoretical model of the solar cell according to the present invention.

As shown in FIG. 2, the model is established by the following steps. Step L1: a photocurrent density of the solar cell generated by a standard AM1.5G solar spectral irradiance is determined, and a relationship between the photocurrent density and an incident photon energy is obtained. Step L2: a radiative recombination photocurrent density of the solar cell in the PCSC model generated in the photon confinement structure is determined, and a relationship between the radiative recombination photocurrent density and the incident photon energy is obtained. Step L3: a relationship between the radiative recombination photocurrent density $J_{rad}$ and the total recombination photocurrent density $J_{recom}$ is determined. Step L4: a current balance equation of the solar cell under the steady-state condition is established, and a relationship between the photocurrent density $J_{sun}$ generated by the standard AM1.5G solar spectral irradiance, the total recombination photocurrent density $J_{recom}$ and the external current density $J_{ext}$ of the solar cell is obtained. Step L5: the open-circuit voltage $V_{OC}$ of the cell is calculated to obtain an open-circuit voltage output of the cell. Step L6: a short-circuit current density $J_{SC}$ of the cell is calculated to obtain a short-circuit current output by the cell. Step L7: an FF is calculated based on the IV data. Step L8: a maximum PCE is calculated based on the IV data.

In the present invention, the theoretical model of the photonically-confined single-junction solar cell is combined with a single-junction solar cell structure model to increase the open-circuit voltage $V_{OC}$ and FF of the single-junction cell, thereby broadening the research horizons for simple, low-cost, and high-efficiency single-junction solar cells.

A cell with a low radiative efficiency $\eta_{rad}$, even when having a small escape probability $f_{esc}$, can still achieve a high FF, open-circuit voltage $V_{OC}$ and PCE, which may greatly surpass the predicted values given by the SQ model.

One or more combinations of solar cell designs and structures capable of reducing $f_{esc}$ to less than 1, especially reducing $f_{esc}$ to less than ½, can also improve the FF, the open-circuit voltage $V_{OC}$ or the PCE.

One or more designs or structures capable of reducing $f_{esc}$ to less than 1, especially reducing $f_{esc}$ to less than ½, can be extended to two-junction and multi-junction cells to further improve the efficiencies of the two-junction and multi-junction cells.

The photon confinement model can be used to prepare optoelectronic logic devices and photodetector devices with high on-off ratios, and thus can be applied to photodetectors, diodes, transistors, and integrated logic circuits thereof.

The photon confinement model can be used to prepare high-performance light-emitting devices, and thus can be applied to LEDs, LETs, lasers, and photoluminescent devices to improve the light-emission efficiency and brightness, while regulating the emission wavelength, linewidth, and photon radiation rate and direction.

The photon confinement model can be used to prepare photothermal devices, and thus can be applied to photothermal power generation devices to regulate the efficiency, power, temperature, voltage and other parameters. The photon confinement model also provides research ideas for improving device performance metrics in other fields.

According to the present invention, the theoretical model is established by the following steps.

Step L1: the photocurrent density of the solar cell generated by the standard AM1.5G solar spectral irradiance is determined, and the relationship between the photocurrent density and the incident photon energy is obtained.

Step L2: the radiative recombination photocurrent density of the PCSC generated in the photon confinement structure is determined, and the relationship between the radiative recombination photocurrent density and the incident photon energy is obtained.

Step L3: the relationship between the radiative recombination photocurrent density $J_{rad}$ and the total recombination photocurrent density $J_{recom}$ is determined.

Step L4: a current balance equation of the solar cell under a steady-state condition is established, and the relationship between the photocurrent density $J_{sun}$ generated by the standard AM1.5G solar spectral irradiance, the total recombination photocurrent density $J_{recom}$ and the external current density $J_{ext}$ of the solar cell is obtained.

Step L5: the open-circuit voltage $V_{OC}$ of the cell is calculated numerically to obtain the open-circuit voltage output of the cell.

Step L6: the short-circuit current density $J_{SC}$ of the cell is calculated numerically to obtain the short-circuit current output of the cell.

Step L7: the FF is calculated based on the IV data.

Step L8: the PCE is calculated based on the IV data.

For an ideal blackbody (that is, an ideal radiator), the escape probability $f_{esc}$ of photons is equal to 1. For a device structure or luminous body that can limit photon escape, its escape probability $f_{esc}$ is less than 1. Particularly, for the design or structure, its $f_{esc}$ is reduced to less than ½.

Step LL: the relationship between the photocurrent density of the single-junction cell generated by the standard AM1.5G solar spectral irradiance and the incident photon energy is obtained as:

$$J_{sun} = \int_0^\infty a(E) \frac{q\lambda}{hc} I_{AM1.5G} dE; \qquad (1)$$

where, q is the elementary charge; λ is the wavelength of the photons; h is the Planck constant; E is the photon energy; $I_{AM1.5G}$ is the standard AM1.5G spectral irradiance (1 sun). For an ideal semiconductor photovoltaic material absorber layer, when the incident photon energy is equal to or exceeds the material bandgap $E_g$, the absorption coefficient a(E) is equal to 100%, otherwise it is equal to 0. The standard AM1.5G solar spectral irradiance (1 sun) is integrated to obtain a standard incident sunlight power of 1,000 W/m².

Step L2: the relationship between the radiative recombination photocurrent flux $\phi_{rad}$ generated by the single-junction solar cell in the photon confinement structure and an external voltage is obtained as:

$$\phi_{rad} = f_{esc} \int_{E_g}^{\infty} \frac{2\pi E^2}{h^3 c^2} \frac{1}{\left[e^{\frac{E-qV}{kT}} - 1\right]} dE; \quad (2)$$

where, E is the photon energy; V is the voltage corresponding to quasi-Fermi level splitting; $f_{esc}$ is the escape probability of emitted phones (0<$f_{esc}$≤1); k the Boltzmann constant; T is the temperature of the solar cell.

Step L3: the relationship between the radiative recombination photocurrent density $J_{rad}$ and the total recombination photocurrent density of the single-junction solar cell is obtained as:

$$J_{rad} = qf_{esc} \int_{E_g}^{\infty} \frac{2\pi E^2}{h^3 c^2} \frac{1}{\left[e^{\frac{E-qV}{kT}} - 1\right]} dE. \quad (3)$$

The relationship between the radiative recombination photocurrent density Jr, and the total recombination photocurrent density is:

$$J_{rad} = \eta_{rad} J_{recom} \quad (4).$$

Then, the total recombination photocurrent density $J_{recom}$ including radiative recombination and non-radiative recombination can be written as:

$$J_{recom} = \frac{1}{\eta_{rad}} J_r = \frac{f_{esc}q}{\eta_{rad}} \int_{E_g}^{\infty} \frac{2\pi E^2}{h^3 c^2} \frac{1}{\left[e^{\frac{E-qV}{kT}} - 1\right]} dE. \quad (5)$$

Step L4: the relationship between the photocurrent density, the total recombination photocurrent density and the external current density of the solar cell is obtained as:

$$J_{sun} - J_{recom} - J_{ext} = 0 \quad (6);$$

Step L5: the external current density Jet of the solar cell is obtained according to Eqs. (1), (5) and (6), which is expressed as:

$$J_{ext} = \int_0^{\infty} a(E) \frac{q\lambda}{hc} I_{AM1.5G} dE - \frac{f_{esc}q}{\eta_{rad}} \int_{E_g}^{\infty} \frac{2\pi E^2}{h^3 c^2} \frac{1}{\left[e^{\frac{E-qV}{kT}} - 1\right]} dE; \quad (7)$$

where, the open-circuit voltage $V_{OC}$ is obtained by setting $J_{ext}=0$:

$$\int_0^{\infty} a(E) \frac{q\lambda}{hc} I_{AM1.5G} dE - \frac{f_{esc}q}{\eta_{rad}} \int_{E_g}^{\infty} \frac{2\pi E^2}{h^3 c^2} \frac{1}{\left[e^{\frac{E-qV}{kT}} - 1\right]} dE = 0. \quad (8)$$

Step L6: based on the expression of the external current density $J_{ext}$, the short-circuit current density $J_{SC}$ is obtained by setting V=0, which is expressed as:

$$J_{SC} = \int_0^{\infty} a(E) \frac{q\lambda}{hc} I_{AM1.5G} dE - \frac{f_{esc}q}{\eta_{rad}} \int_{E_g}^{\infty} \frac{2\pi E^2}{h^3 c^2} \frac{1}{\left[e^{\frac{E}{kT}} - 1\right]} dE; \quad (9)$$

where, after photons from sunlight are converted by an ideal semiconductor, E>>kT to derive $$e^{\frac{E}{kT}} \gg 1,$$

indicating that the second term $$\frac{f_{esc}q}{\eta_{rad}} \int_{E_g}^{\infty} \frac{2\pi E^2}{h^3 c^2} \frac{1}{\left[e^{\frac{E}{kT}} - 1\right]}$$

is very small, so $J_{SC}$ is a constant independent of $f_{esc}$ and $\eta_{rad}$, and can be expressed as:

$$J_{SC} = \int_0^{\infty} a(E) \frac{q\lambda}{hc} I_{AM1.5G} dE. \quad (10)$$

The output current values of the cell under different voltages are obtained based on the open-circuit current $V_{OC}$ and the short-circuit current density $J_{SC}$, so as to derive an IV curve, and calculate the FF expressed as follows:

$$FF = \frac{V_{mp} J_{mp}}{V_{OC} J_{SC}}; \quad (12)$$

where, $V_{mp}$ and $J_{mp}$ are voltage and current densities at a maximum power point in the IV curve, respectively.

Step L8: the output current values of the cell under different voltages are obtained based on the open-circuit current $V_{OC}$ and the short-circuit current density $J_{SC}$, so as to derive the IV curve, and calculate the maximum PCE expressed as follows:

$$PCE = \frac{P_{max}}{P_{sun}} = \frac{V_{mp} J_{mp}}{P_{sun}}; \quad (11)$$

where, $V_{mp}$ and $J_{mp}$ are voltage and current densities at the maximum power point in the IV curve, respectively.

The theoretical model of the single-junction solar cell leads to a possible device structure for realizing the photonically-confined single-junction solar cell, but the model of the present invention is not limited to this structure. A design or structure capable of reducing $f_{esc}$ to less than 1, especially reducing $f_{esc}$ to less than ½ includes incident the sunlight X1, the bandpass reflector X2, the perfect reflectors X3, X4 and X5, the escape photons X6 and the confined photons X7 The bandpass reflector X2 at the top surface of the cell allows all photons with energy higher than the absorption wavelength of the semiconductor photovoltaic material to pass through and enter the absorber, so as to ensure that the cell fully absorbs the effective incident sunlight. The inner surface X3 at the bottom of the cell and the inner surfaces X4 and X5 of the side walls of the cell are all perfect reflectors (mirrors). After the incident sunlight enters a semiconductor photovoltaic absorber layer through the bandpass reflector, the semiconductor photovoltaic absorber layer converts the absorbed sunlight into photons X7. The photons X7 generated in the cell are emitted around. After reaching the perfect reflector (mirror) surface X3 at the bottom, the perfect reflector (mirror) surface X4 on the side wall, and the perfect reflector (mirror) surface X5 on the side wall, all photons X7 return to the absorber layer without energy loss. The photons X7 reaching the top have lower energy than the photons absorbed by the semiconductor material, and thus are reflected back by the bandpass reflector X2 to the absorber layer without energy loss. However, since the bandpass reflector X2 cannot make all the photons return to the semiconductor photovoltaic absorber layer, there are still some photons X6 escaping from the surface of the cell.

The single-junction solar cell structure model can increase the open-circuit voltage $V_{OC}$ and FF of the single-junction cell, thereby broadening the research horizons for simple-operation, low-cost, and high-efficiency single-junction solar cells.

In the solar cell structure model, a cell with a low radiative efficiency $\eta_{rad}$, even when having a small escape probability $f_{esc}$, can still have a high FF, open-circuit voltage $V_{OC}$ and PCE, which can greatly surpass the predicted values in the existing SQ model.

One or more combinations of solar cell designs and structures capable of reducing $f_{esc}$ to less than 1, especially reducing $f_{esc}$ to less than ½, can also improve the FF, the open-circuit voltage $V_{OC}$ or the PCE.

The theoretical model of the single-junction solar cell based on one or more designs or structures capable of reducing $f_{esc}$ to less than 1, especially reducing $f_{esc}$ to less than ½, can be extended to two-junction and multi-junction cells to further improve the efficiency of the two-junction and multi-junction cells.

The theoretical model based on the one or more designs or structures capable of reducing $f_{esc}$ to less than 1, especially reducing $f_{esc}$ to less than ½, can be used to prepare optoelectronic logic devices and photodetector devices with high on-off ratios, such as photodetectors, diodes, transistors and integrated logic circuits thereof.

The theoretical model based on the one or more designs or structures capable of reducing $f_{esc}$ to less than 1, especially reducing $f_{esc}$ to less than ½, can be used to prepare light-emitting devices, such as LEDs, LETs, lasers, and photoluminescent devices to improve the light-emission efficiency and brightness, while regulating the emission wavelength, linewidth, and photon radiation rate and direction.

The theoretical model based on the one or more designs or structures capable of reducing $f_{esc}$ to less than 1, especially reducing $f_{esc}$ to less than ½, can be used to prepare photothermal devices, such as photothermal power generation devices to regulate the efficiency, power, temperature, voltage and other parameters.

In order to realize a possible device and explain its principle, the present invention designs a PCSC structure model. The cell allows photons with higher energy than the bandgap of the semiconductor photovoltaic absorber layer to be absorbed. The photons in the cell are fully confined by the bandpass reflector at the top surface and the perfect reflectors (mirrors) at the bottom and on the side walls. It is assumed herein that for an ideal semiconductor, the Stokes shift between the emission wavelengths of the semiconductor photovoltaic absorber layer and the photovoltaic material is very small, and the emission bandwidth of the semiconductor photovoltaic material is sufficiently small. After effective incident sunlight enters the semiconductor photovoltaic absorber layer through the bandpass reflector, the semiconductor photovoltaic absorber layer converts the absorbed sunlight into photons. The photons generated in the cell are emitted around. After reaching the perfect reflector (mirror) surface at the bottom, the perfect reflector (mirror) surface on the side wall and the perfect reflector (mirror) surface on the side wall, all photons return to the absorber layer without energy loss. The photons reaching the top are reflected back by the bandpass reflector to the absorber layer without energy loss. However, since the bandpass reflector cannot make all the photons return to the semiconductor photovoltaic absorber layer, there are still some photons escaping from the surface of the cell. The photon confinement structure inside the cell limits the probability of photons escaping from the cell to increase the photon density in the cell while reducing the loss caused by radiative recombination, thereby improving the performance of the cell. The photons that would otherwise escape from the cell and be lost by means of radiation are collected, so that the concentration of photons in the cell is increased. The reabsorption of these photons by the semiconductor material will generate more electron-hole pairs, so that more electrons in the cell flow to the negative electrode, and the electron-holes flow to the positive electrode, thereby increasing the open-circuit voltage $V_{OC}$.

Figure 3:
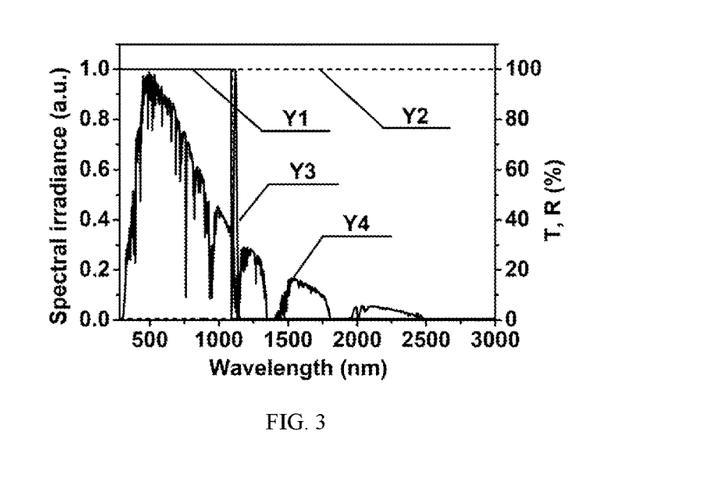
FIG. 3 shows the optical characteristics of the solar cell according to the present invention.

FIG. 3 shows optical characteristics of the PCSC according to an embodiment of the present invention, where the abscissa axis indicates the working wavelength of the solar cell, in nm, the left ordinate axis indicates the spectral irradiance, in arbitrary unit (a.u.), and the right ordinate axis indicates the transmittance T and reflectance R of the bandpass reflector at the top surface of the solar cell. The black solid line Y1 in the figure indicates the transmittance of the bandpass reflector at the top surface of the cell with respect to the standard AM1.5G solar radiation. The reflector achieves a 100% transmittance for the incident light with higher energy than the bandgap wavelength of the semiconductor material. The black dotted line Y2 indicates a 100% reflectance of the bandpass reflector at the top surface of the cell with respect to the standard AM1.5G solar radiation. The reflector makes all incident light with lower energy than the bandgap wavelength of the semiconductor material impermeable. The black solid line Y3 indicates an emission spectrum of the semiconductor photovoltaic absorber material, and the black solid line Y4 indicates the standard AM1.5G solar radiation spectrum. In the figure, the data are normalized for the convenience of illustration.

Two basic parameters to characterize the performance metrics of the solar cell are the short-circuit current density and the open-circuit voltage. According to different currents obtained under different bias voltages, a current-voltage (IV) curve can be created. The IV curve has a maximum power point that enables the cell to output the maximum power. The PCE, FF and other derived parameters are analyzed based on the short-circuit current density and the open-circuit voltage. Therefore, the working parameters of the PCSC, namely the open-circuit voltage and the short-circuit current density, are explained first.

In case that the performance of the cell is characterized by the short-circuit current density, when a loop is formed outside the cell, the number of electron-hole pairs collected by the positive and negative electrodes of the cell increases, that is, the current flowing from the positive electrode of the cell to the negative electrode of the cell increases. This means that the short-circuit current density in the parameters of characterizing the performance of the solar cell will increase. Similarly, in case that the performance of the cell is characterized by the open-circuit voltage, when a measuring instrument is connected to the outside of the cell, the number of electron-hole pairs in the positive and negative electrodes of the cell increases. Namely, the positive electrode collects more electron-holes while the negative electrode collects more electrons, that is, the voltage difference between the positive and negative electrodes of the cell will increase. This means that the open-circuit voltage in the parameters of characterizing the performance of the solar cell will increase.

The present invention proposes a theoretical model of a PCSC and optoelectronic device, and designs a solar cell structure based on the model. In the theoretical model, the probability of photons escaping from the solar cells is reduced to effectively suppress the energy loss caused by non-radiative and radiative recombination, thereby significantly increasing the open-circuit voltage $V_{OC}$ and FF to create the possibility of significantly increasing the PCE limit of the solar cell. The cell structure and the theoretical model of the present invention can be extended to new types of cells such as multi-junction cells, hot carrier cells, and concentrator cells to further improve the cell efficiency, and can be extended to other optoelectronic devices to optimize performance metrics.

The present invention is described in further detail below.

One aspect of the present invention proposes a photon confinement theoretical model and designs a PCSC structure. Prior to the establishment of the theoretical model of the PCSC, the calculation method of the SQ model is explained first. It is inevitable that the radiative and non-radiative recombination losses are considered in the SQ model. Therefore, for the model calculation, the probability $f_{esc}$ of photons escaping from the cell is normalized to 1. Different from the SQ model, the PCSC model significantly reduces the probability $f_{esc}$ of photons escaping from the cell ($f_{esc} \ll 1$). It should be explained that a relatively small probability $f_{esc}$ of photons escaping from the cell does not refer to the total number of photons escaping from the solar cell per unit time, but refers to the escape probability of photons. When the number of incoming and outgoing photons and the electron-hole pairs reach equilibrium, they are still in accordance with the detailed balance theory. There is a small probability $f_{esc}$ of photons escaping in the PCSC model, but the total amount of sunlight incident on the cell does not decrease, which means that a high concentration of photons can be accumulated inside the cell.

Step L1: the photocurrent density of the solar cell generated by the standard AM1.5G solar spectral irradiance is determined. The photocurrent density generated by the standard AM1.5G solar spectral irradiance is expressed as:

$$J_{sun} = \int_0^\infty a(E) \frac{q\lambda}{hc} I_{AM1.5G} dE; \quad (1)$$

where, $J_{sun}$ is the photocurrent density generated by the standard AM1.5G solar spectral irradiance; q is an elementary charge, $1.6*10^{-19}$ C; $\lambda$ is the wavelength of the photons, 280-4,000 nm; h is the Planck constant, $6.6260689633*10^{-34}$ J*s; E is a photon energy, 0.1-4.3 eV; $I_{AM1.5G}$ is the standard AM1.5G spectral irradiance (1 sun); c is the speed of light, $3*10^8$ m/s; a(E) is the absorption coefficient of a photovoltaic material as a function of wavelengths of light. For an ideal semiconductor photovoltaic material absorber layer, when the incident photon energy is equal to or exceeds the material bandgap $E_g$, the absorption coefficient a(E) is equal to 100%. When the incident photon energy is less than the absorber material bandgap $E_g$, the absorption coefficient a(E) is equal to 0. The standard AM1.5G solar spectral irradiance is integrated over 0 to $\infty$ corresponding to the range of photon energy to obtain a standard incident sunlight power of 1,000 W/m².

Step L2: the radiative recombination photocurrent flux of the solar cell generated in the photon confinement structure is determined. According to Planck's law and Kirchhoff's law, the relationship between the radiative recombination photocurrent flux $\phi_{rad}$ generated by the solar cell and an external voltage is:

$$\phi_{rad} = f_{esc} \int_{E_g}^\infty \frac{2\pi E^2}{h^3 c^2} \frac{1}{\left[e^{\frac{E-qV}{kT}} - 1\right]} dE; \quad (2)$$

where, $\phi_{rad}$ is the radiative recombination photocurrent flux; $f_{esc}$ is the escape probability of a photon generated in the cell; E is the photon energy, 0.1-4.3 eV; $E_g$ is the bandgap energy corresponding to the photovoltaic absorber material of the solar cell; $\pi$ is the Archimedes' constant; h is the Planck constant, $6.6260689633*10^{-34}$ J*s; c is the speed of light, $3*10^8$ m/s; V is a voltage corresponding to quasi-Fermi level splitting; q is an elementary charge, $1.6*10^{-19}$ C, and $0 < f_{esc} \leq 1$; k is the Boltzmann constant, $1.3806505*10^{-23}$ J/K; T is the temperature of the solar cell, 298.15° C.; e is an exponential coefficient. As such, the radiative recombination photocurrent flux is multiplied by the elementary charge q to obtain the radiative recombination photocurrent density $J_{rad}$ expressed as:

$$J_{rad} = qf_{esc} \int_{E_g}^\infty \frac{2\pi E^2}{h^3 c^2} \frac{1}{\left[e^{\frac{E-qV}{kT}} - 1\right]} dE; \quad (3)$$

Step L3: the relationship between the radiative recombination photocurrent density $J_{rad}$ and the total recombination photocurrent density $J_{recom}$ is determined. The recombination current can also be generalized to include the non-radiative recombination current, but the actual proportion of the non-radiative recombination current is relatively small. If the radiative recombination efficiency is set as $\eta_{rad}$, $\eta_{rad}$, being the radiative efficiency coefficient of the solar cell material, then the relationship between the radiative recombination photocurrent density $J_{rad}$ and the total recombination photocurrent density $J_{recom}$ including radiative recombination and non-radiative recombination is expressed as:

$$J_{rad} = \eta_{rad} J_{recom} \quad (4).$$

Then, the total recombination photocurrent density $J_{recom}$ including radiative and non-radiative recombination can be written as:

$$J_{recom} = \frac{1}{\eta_{rad}} J_r = \frac{f_{esc} q}{\eta_{rad}} \int_{E_g}^\infty \frac{2\pi E^2}{h^3 c^2} \frac{1}{\left[e^{\frac{E-qV}{kT}} - 1\right]} dE. \quad (5)$$

Step L4: a current balance equation of the solar cell under a steady-state condition is established. Under the steady-state condition, according to Kirchhoff's current law and the law of conservation of particles, the detailed balance current in the solar cell can be expressed as $$J_{sun} - J_{recom} - J_{ext} = 0 \tag{6}$$

where, $J_{sun}$ is the photocurrent density generated by the AM1.5G solar irradiation, $J_{recom}$ is the total recombination current density, and $J_{ext}$ is the current density output by the solar cell.

Step L5: the open-circuit voltage $V_{OC}$ is calculated numerically. The external current density Jet of the solar cell is obtained according to steps L1 and L3, which can be expressed as:

$$J_{ext} = \int_0^\infty a(E) \frac{q\lambda}{hc} I_{AM1.5G} dE - \frac{f_{esc} q}{\eta_{rad}} \int_{E_g}^\infty \frac{2\pi E^2}{h^3 c^2} \frac{1}{\left[e^{\frac{E-qV}{kT}} - 1\right]} dE; \tag{7}$$

where, the open-circuit voltage $V_{OC}$ is obtained by setting $J_{ext}=0$:

$$\int_0^\infty a(E) \frac{q\lambda}{hc} I_{AM1.5G} dE - \frac{f_{esc} q}{\eta_{rad}} \int_{E_g}^\infty \frac{2\pi E^2}{h^3 c^2} \frac{1}{\left[e^{\frac{E-qV_{OC}}{kT}} - 1\right]} dE = 0. \tag{8}$$

Step L6: the short-circuit voltage $J_{SC}$ is calculated numerically, where, the short-circuit voltage $J_{SC}$ is obtained by setting V=0:

$$J_{SC} = \int_0^\infty a(E) \frac{q\lambda}{hc} I_{AM1.5G} dE - \frac{f_{esc} q}{\eta_{rad}} \int_{E_g}^\infty \frac{2\pi E^2}{h^3 c^2} \frac{1}{\left[e^{\frac{E}{kT}} - 1\right]} dE; \tag{9}$$

where, after photons from sunlight are converted by a semiconductor, E>>kT to derive $$e^{\frac{E}{kT}} \gg 1,$$

indicating that the second term $$\frac{q f_{esc}}{\eta_{rad}} \int_{E_g}^\infty \frac{2\pi E^2}{h^3 c^2} \frac{1}{\left[e^{\frac{E}{kT}} - 1\right]}$$

is very small, so $J_{SC}$ is a constant independent of $f_{esc}$ and $\eta_{rad}$, and can be expressed as:

$$J_{SC} \approx \int_0^\infty a(E) \frac{q\lambda}{hc} I_{AM1.5G} dE. \tag{10}$$

Step L7: the maximum PCE is calculated based on the IV data. The PCE of the solar cell is numerically calculated according to the equation in step L6. The following is a standard PCE equation.

$$PCE = \frac{P_{max}}{P_{sun}} = \frac{V_{mp} J_{mp}}{P_{sun}}; \tag{11}$$

where, $P_{max}$ is the maximum power output by the solar cell; $P_{sun}$ is the power of sunlight incident on the solar cell; $V_{mp}$ is the voltage of the solar cell at its maximum power point; $J_{mp}$ is the current density of the solar cell at its maximum power point;

Step L8: the FF is calculated based on the IV data. The FF is calculated as follows:

$$FF = \frac{V_{mp} J_{mp}}{V_{OC} J_{SC}}; \tag{12}$$

where, $V_{mp}$ is the voltage at the maximum power point of the solar cell; $J_{mp}$ is the current density at the maximum power point of the solar cell; $V_{OC}$ is the open-circuit voltage of the solar cell; $J_{SC}$ is the short-circuit current density of the solar cell.

In order to simulate the theoretical results of the PCSC, halide perovskite, as a solar cell material, which has attracted much attention in recent years, is used as the semiconductor photovoltaic absorber layer. The halide perovskite photovoltaic material used herein is MAPbI$_3$, with a bandgap of 1.55 eV.

Figure 4:
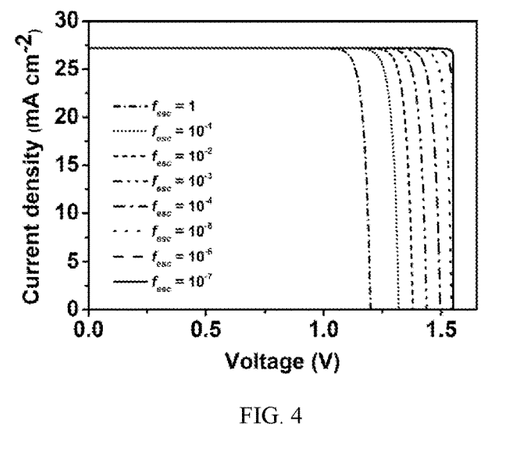
FIG. 4 shows the IV data of the solar cell with a high fill factor (FF) according to the present invention.

As shown in FIG. 4, the IV curves in case of different values of the photon escape probability $f_{esc}$ are simulated, where the abscissa axis indicates the working voltage, in V; the ordinate axis indicates the current density output by the solar cell, in mA cm$^{-2}$. The curves in the figure are created in case of different values of the photon escape probability $f_{esc}$. When the value of $f_{esc}$ reaches $10^{-7}$, the IV curve has a very steep falling edge near the semiconductor bandgap. Diodes with this characteristic can be widely used in optoelectronic circuits that require ultra-high on-off ratios.

Figure 5:
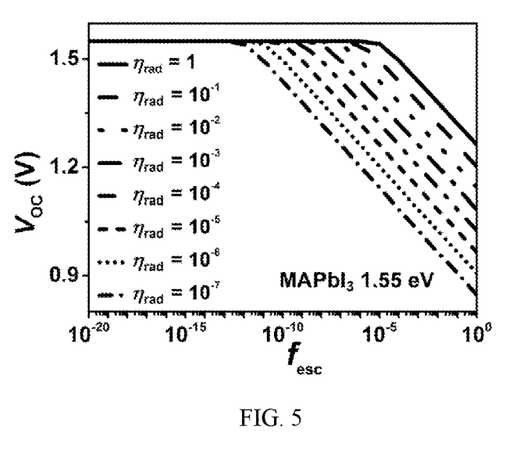
FIG. 5 shows the open-circuit voltage $V_{OC}$ of the solar cell varying with the escape probability $f_{esc}$ according to the present invention.

As shown in FIG. 5, the abscissa axis indicates the photon escape probability $f_{esc}$, and the ordinate axis indicates the open-circuit voltage $V_{OC}$, in V. For an ideal perovskite with no radiative loss ($\eta_{rad}=1$), when $f_{esc}$ is $10^{-6}$, the maximum theoretical open-circuit voltage $V_{OC}$ approaches 1.55 eV (bandgap). When the radiation coefficient $\eta_{rad}$ of the photovoltaic material of the solar cell is 1 and the $f_{esc}$ is $10^{-2}$ (1 out of 100 photons can escape from the cell), an open-circuit voltage that is about 0.1 V higher than the maximum open-circuit voltage $V_{OC}$ predicted by the SQ model is obtained. Solar cells have different curves under different radiation coefficients $\eta_{rad}$. Even when the radiation coefficient is small, a very high open-circuit voltage $V_{OC}$ can still be reached if the photon escape probability is sufficiently small.

Figure 6:
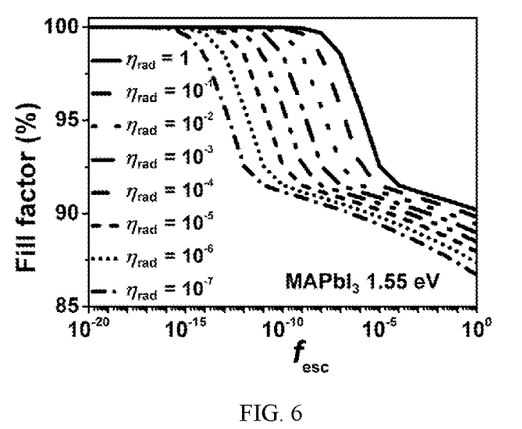
FIG. 6 shows the fill factor (FF) of the solar cell varying with the escape probability $f_{esc}$ according to the present invention.

As shown in FIG. 6, the abscissa axis indicates the photon escape probability $f_{esc}$, and the ordinate axis indicates the FF. After the photon confinement ability is improved, when the photon escape probability $f_{esc}$ is low, the FF of the solar cell approaches 100%. The combined effect of the greatly improved open-circuit voltage $V_{OC}$ and FF significantly improves the PCE of the solar cell in the photon confinement model. All simulations in the present invention are based on a single-junction cell under standard 1-sun illumination, rather than a multi-junction tandem cell under concentrated sunlight. In order to summarize how the photovoltaic performance of the solar cell changes with the varying bandgap, the theoretical limits of the open-circuit voltage $V_{OC}$ and FF in the theoretical model ($f_{esc} \leq 1$) and the SQ model ($f_{esc}=1$) are calculated. When the photon escape probability decreases, the maximum $qV_{OC}$ (where q is the elementary charge) approaches the bandgap. This shows that when the radiative recombination loss caused by a voltage deficit of $E_g$-$qV_{OC}$ decreases, the quasi-Fermi level splitting reaches the limit to achieve a higher open-circuit voltage $V_{OC}$ than in the SQ model. Correspondingly, when the photon escape probability $f_{esc}$ of the cell is very small, for any given bandgap, the theoretical limit of the FF can approach 100%. Solar cells have different curves under different radiation coefficients $\eta_{rad}$. Even when the radiation coefficient is small, a high FF can still be reached if the photon escape probability is sufficiently small.

FIGS. 5 and 6 show an important result that a material with a low radiative efficiency $\eta_{rad}$, when having a lower photon escape probability $f_{esc}$, can also achieve the maximum open-circuit voltage $V_{OC}$ and FF. This shows that the non-radiative recombination of the PCSC model does not restrict the upper limits of the open-circuit voltage $V_{OC}$ and FF. It follows from the above that the theoretical limit of the FF in the PCSC model approaches 100%.

Figure 7:
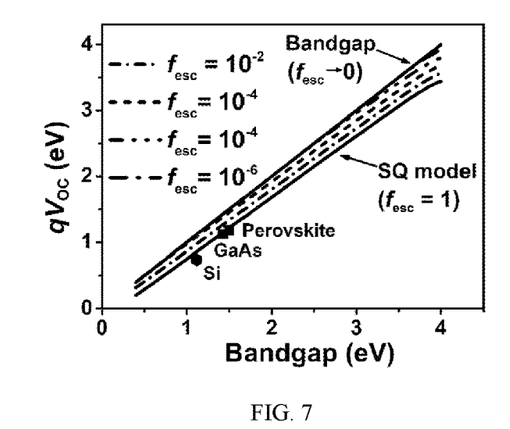
FIG. 7 shows the relationship between the open-circuit voltage and bandgap according to the present invention.

FIG. 7 shows the relationship between the open-circuit voltage and the varying bandgap, where the abscissa axis indicates the varying bandgap, in eV, and the ordinate axis indicates the product of the charge and the open-circuit voltage $qV_{OC}$, in eV. When the photon escape probability $f_{esc}$ decreases, the open-circuit voltage $qV_{OC}$ in the PCSC model surpasses the open-circuit voltage limit of the SQ model. When $f_{esc}$ approaches 0, $qV_{OC}$ approaches the bandgap of the photovoltaic absorber material of the solar cell, indicating that the open-circuit voltage $V_{OC}$ of the PCSC still has a large potential for improvement.

Figure 8:
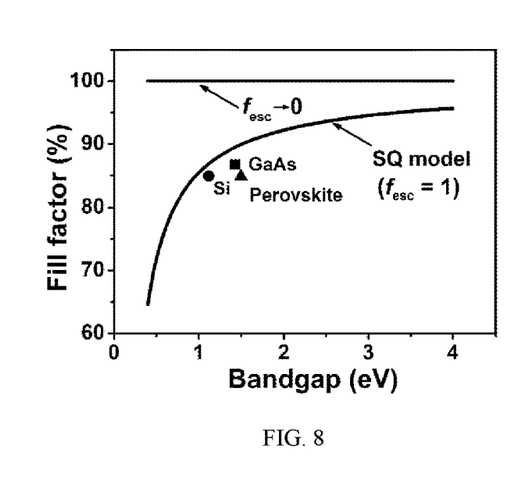
FIG. 8 shows the FFs of the photonically-confined solar cell (PCSC) model and the Shockley-Queisser (SQ) model under different bandgaps according to the present invention.

FIG. 8 shows the FF changing with the varying bandgap in the PCSC model and the SQ model, where the abscissa axis indicates different bandgaps, in eV, and the ordinate axis indicates the FF. The curves in the figure show the FF of the solar cell in the SQ model when $f_{esc}=1$ and when $f_{esc}$ approaches 0 (the horizontal line), respectively. At present, as the performance of the solar cell increases and the photon escape probability $f_{esc}$ decreases, the Si-based material, the GaAs-based material and the Perovskite material all approach the FF limit in the SQ model. However, the perovskite material still has a large room for improvement to reach the limit in the SQ model. When the photon escape probability $f_{esc}$ approaches 0, the FF in the PCSC model approaches 100% under different bandgaps, and thus is significantly improved compared with that in the SQ model, which provides guidance for the improvement of device performance.

Figure 9:
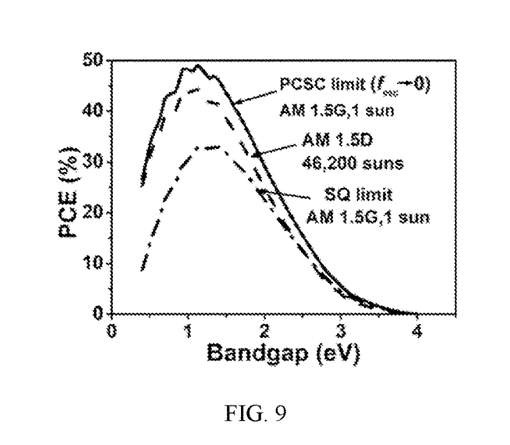
FIG. 9 shows a comparison of efficiencies between the PCSC model and the SQ model according to the present invention.

FIG. 9 shows a comparison of calculated efficiencies between the SQ model and the PCSC model, where the abscissa axis indicates the bandgap, in eV, and the ordinate axis indicates the PCE output by the solar cell. The black line indicates the efficiency limit in the PCSC model, where $f_{esc}$ approaches 0. The broken line indicates the limit efficiency curve of the concentrator cell under 46,200 suns (AM 1.5D). The dot-dashed line indicates the limit efficiency curve in the SQ model under 1 sun (AM 1.5G), where the photon escape probability $f_{esc}$ is 1. The FF approaching 100% has the advantages that it can greatly improve the PCE, so that the PCE of the single-junction solar cell under 1 sun in the PCSC model is significantly higher than the PCE in the SQ model, and even higher than the theoretical PCE of the single-junction solar cell under the highest sunlight concentration. This shows that the PCSC has great potential in achieving high efficiency.

What is claimed is:

1. A method of generating a solar cell device structure design by establishing a photon confinement theoretical model for preparing a photonically-confined solar cell and a photonically-confined optoelectronic device, the establishing of the photon confinement theoretical model comprising the following steps:

step L1: determining, using at least once computer processor, a photocurrent density of the photonically-confined solar cell generated by a standard AM1.5G solar spectral irradiance, and obtaining a relationship between the photocurrent density and an incident photon energy;

wherein, the photocurrent density generated by the standard AM1.5G solar spectral irradiance is described by:

$$J_{sun} = \int_0^\infty a(E) \frac{q\lambda}{hc} I_{AM1.5G} dE; \tag{1}$$

wherein, $J_{sun}$ is the photocurrent density generated by the standard AM1.5G solar spectral irradiance; q is an elementary charge; $\lambda$ is a wavelength of photons; h is a Planck constant; E is a photon energy; $I_{AM1.5G}$ is the standard AM1.5G spectral irradiance; c is a speed of light; a(E) is an absorption coefficient of a photovoltaic material as a function of wavelengths of light;

step L2: determining, using the at least once computer processor, a radiative recombination photocurrent density of the photonically-confined solar cell, wherein the radiative recombination photocurrent density of the photonically-confined solar cell is generated in a photon confinement structure, and obtaining a relationship between the radiative recombination photocurrent density and the incident photon energy;

wherein, a relationship between a radiative recombination photocurrent flux $\phi_{rad}$ generated by the photonically-confined solar cell and an external voltage is:

$$\phi_{rad} = f_{esc} \int_E^\infty \frac{2\pi E^2}{h^3 c^2} \frac{1}{\left[e^{\frac{E-qV}{kT}} - 1\right]} dE; \tag{2}$$

wherein, $\phi_{rad}$ is the radiative recombination photocurrent flux; $f_{esc}$ is an escape probability of the photons generated in the photonically-confined solar cell; E is the photon energy; $E_g$ is a bandgap of a photovoltaic absorber material; $\pi$ is an Archimedes' constant; h is the Planck constant; c is the speed of light; V is a voltage corresponding to a quasi-Fermi level splitting within the photovoltaic absorber material; q is the elementary charge; k is a Boltzmann constant; T is a temperature of the photonically-confined solar cell; e is a base of a natural logarithm; the radiative recombination photocurrent flux is multiplied by the elementary charge q to obtain the radiative recombination photocurrent density $J_{rad}$:

$$J_{rad} = qf_{esc} \int_{E_g}^\infty \frac{2\pi E^2}{h^3 c^2} \frac{1}{\left[e^{\frac{E-qV}{kT}} - 1\right]} dE; \tag{3}$$

step L3: determining, using the at least once computer processor, a relationship between the radiative recombination photocurrent density $J_{rad}$ and a total recombination photocurrent density $J_{recom}$;
wherein, the relationship between the radiative recombination photocurrent density $J_{rad}$ and the total recombination photocurrent density $J_{recom}$ comprising a radiative recombination and a non-radiative recombination is expressed as:

$$J_{rad} = \eta_{rad} J_{recom} \quad (4);$$

the total recombination photocurrent density $J_{recom}$ comprising the radiative recombination and the non-radiative recombination is:

$$J_{recom} = \frac{1}{\eta_{rad}} J_{rad} = \frac{f_{esc} q}{\eta_{rad}} \int_{E_g}^{\infty} \frac{2\pi E^2}{h^3 c^2} \frac{1}{\left[e^{\frac{E-qV}{kT}} - 1\right]} dE; \quad (5)$$

step L4: establishing, using the at least once computer processor, a current balance equation of the photonically-confined solar cell under a steady-state condition, and obtaining a relationship between the photocurrent density $J_{sun}$ generated by the standard AM1.5G solar spectral irradiance, the total recombination photocurrent density $J_{recom}$ and an external current density $J_{ext}$ of the photonically-confined solar cell;

$$J_{sun} - J_{recom} - J_{ext} = 0 \quad (6);$$

step L5: calculating, using the at least once computer processor, an open-circuit voltage $V_{OC}$ of the photonically-confined solar cell numerically to obtain an open-circuit voltage output of the photonically-confined solar cell, and obtaining the external current density $J_{ext}$ of the photonically-confined solar cell by steps L1 and L3 as:

$$J_{ext} = \int_0^{\infty} a(E) \frac{q\lambda}{hc} I_{AM1.5G} dE - \frac{f_{esc} q}{\eta_{rad}} \int_{E_g}^{\infty} \frac{2\pi E^2}{h^3 c^2} \frac{1}{\left[e^{\frac{E-qV}{kT}} - 1\right]} dE; \quad (7)$$

wherein, the open-circuit voltage $V_{OC}$ is obtained by setting $J_{ext} = 0$:

$$\int_0^{\infty} a(E) \frac{q\lambda}{hc} I_{AM1.5G} dE - \frac{f_{esc} q}{\eta_{rad}} \int_{E_g}^{\infty} \frac{2\pi E^2}{h^3 c^2} \frac{1}{\left[e^{\frac{E-qV_{OC}}{kT}} - 1\right]} dE = 0; \quad (8)$$

step L6: calculating, using the at least once computer processor, a short-circuit current density $J_{SC}$ of the photonically-confined solar cell numerically to obtain a short-circuit current output of the photonically-confined solar cell, wherein the short-circuit current density $J_{SC}$ is obtained by setting $V=0$:

$$J_{SC} = \int_0^{\infty} a(E) \frac{q\lambda}{hc} I_{AM1.5G} dE - \frac{f_{esc} q}{\eta_{rad}} \int_{E_g}^{\infty} \frac{2\pi E^2}{h^3 c^2} \frac{1}{\left[e^{\frac{E}{kT}} - 1\right]} dE; \quad (9)$$

wherein, after photons from sunlight are converted by a semiconductor, $E \gg kT$ to derive $$e^{\frac{E}{kT}} \gg 1,$$

a second term $$\frac{q f_{esc}}{\eta_{rad}} \int_{E_g}^{\infty} \frac{2\pi E^2}{h^3 c^2} \frac{1}{\left[e^{\frac{E}{kT}} - 1\right]}$$

is negligible, $J_{SC}$ is a constant independent of $f_{esc}$ and $\eta_{rad}$, and $J_{SC}$ is expressed as:

$$J_{SC} \approx \int_0^{\infty} a(E) \frac{q\lambda}{hc} I_{AM1.5G} dE; \quad (10)$$

step L7: obtaining, using the at least once computer processor, a maximum power conversion efficiency (PCE) based on current-voltage (IV) data, wherein a PCE of the photonically-confined solar cell is numerically calculated according to equation (9) and equation (10) in step L6 as:

$$PCE = \frac{P_{max}}{P_{sun}} = \frac{V_{mp} J_{mp}}{P_{sun}}; \quad (11)$$

wherein, $P_{max}$ is a maximum power output by the photonically-confined solar cell; $P_{sun}$ is a power of the sunlight incident on the photonically-confined solar cell; $V_{mp}$ is a voltage of the photonically-confined solar cell at a maximum power point of the photonically-confined solar cell; $J_{mp}$ is a current density of the solar cell at the maximum power point of the photonically-confined solar cell;

step L8: obtaining, using the at least once computer processor, a fill factor (FF) of the photonically-confined solar cell based on the IV data;

$$FF = \frac{V_{mp} J_{mp}}{V_{OC} J_{SC}}; \quad (12)$$

wherein, $V_{mp}$ is the voltage at the maximum power point of the photonically-confined solar cell; $J_{mp}$ is the current density at the maximum power point of the photonically-confined solar cell; $V_{OC}$ is the open-circuit voltage of the photonically-confined solar cell; and $J_{SC}$ is the short-circuit current density of the photonically-confined solar cell; and using the photon confinement theoretical model to build a solar cell structure, the solar cell structure having photon confinement structures provided on surfaces and edges of a solar cell to effectively reduce a probability of photons escaping from the solar cell and to increase an effective photon density inside the solar cell, the solar cell structure having a bandpass reflector at a top surface of the solar cell, a mirror at an inner surface of a bottom surface of the solar cell, and mirrors comprising two inner side walls of the solar cell, the mirrors configured to return photons to an absorber layer of the solar cell, the solar cell structure configured to reduce $f_{esc}$ to less than 1.

2. The method of claim 1, wherein the absorber layer of the solar cell comprises halide perovskite.

3. The method of claim 2, wherein the halide perovskite comprises $MAPbI_3$, with a bandgap of 1.55 eV.

4. The method of claim 1, wherein the solar cell structure is configured to reduce $f_{esc}$ to less than ½.

* * * * *